3,686,261
PROCESS FOR RECOVERING ACRYLONITRILE IN CHLOROPRENE MONOMER
Toshio Sakomura, Akihiko Shimizu, and Tadahiro Mori, Yamaguchi, Japan, assignors to Toyo Soda Manufacturing Co., Ltd., Yamaguchi, Japan
No Drawing. Filed Oct. 28, 1970, Ser. No. 84,950
Claims priority, application Japan, Oct. 28, 1969, 44/86,190
Int. Cl. C07c 121/32
U.S. Cl. 260—465.9                    4 Claims

ABSTRACT OF THE DISCLOSURE

A process for recovering by extraction of the acrylonitrile contained in the recovered monomer after copolymerization of chloroprene containing acrylonitrile by employing a concentrated aqueous solution of zinc chloride as extraction agent is disclosed.

BACKGROUND OF THE INVENTION (1) Field of the invention

The present invention relates to a process for recovering unreacted acrylonitrile contained in the recovered monomer after polymerization in the manufacturing process of chloroprene copolymer containing acrylonitrile. More specifically, the invention relates to a process for recovering by extraction acrylonitrile contained in the recovered monomer after the copolymerization of chloroprene containing acrylonitrile by employing a concentrated aqueous solution of zinc chloride as the extraction agent.

(2) Description of the prior art

It has been difficult, heretofore, to separate acrylonitrile economically from chloroprene monomer. In spite of a difference in the boiling point up to nearly 20° C. between chloroprene and acrylonitrile (the boiling point of chloroprene being 59.5° C., while that of acrylonitrile is 78.5° C.), which apparently suggests that the separation by distillation of the two would be easily possible. In practice, the separation of the two is virtually impossible on commercial basis even if a multistage distillation column is used. Furthermore, since chloroprene is a substance which is by nature particularly susceptible to polymerization, it tends to form a popcorn polymer in the column during the distillation process. Thus distillation to recover acrylonitrile is unfeasible.

SUMMARY OF THE INVENTION

The inventors of the present invention, following experiments and studies in search for a process for recovering acrylonitrile which is both operationally simple and economical, have found that acrylonitrile can be recovered, for example, from chloroprene monomer by extraction at a low temperature employing a concentrated aqueous solution of zinc chloride as an extraction agent. They also found that when water is employed in an equivalent volume to the monomer as a general rule in the extraction, the extraction yield is too low to be of practical value. However, when water is used at a level of ten times the volume of the monomer, the extraction yield increases rendering its practical use possible, but this involves operational disadvantages in that the emulsion produced by the suspension of the monomer and water does not easily disappear, and a small quantity of chloroprene dissolves in water, which make this process undesirable as a recovery process.

DETAILED DESCRIPTION OF THE INVENTION

According to the present invention, acrylonitrile is very rapidly extracted from chloroprene monomer because the concentrated aqueous solution of zinc chloride which forms a complex compound with acrylonitrile is employed as the extraction agent. There is no difficulty in an emulsion remaining, as is the situation when water is employed, because the two phases of the monomer and the zinc chloride solution separate quickly after emulsification. The separation rate here is approximately 20 times as fast as that as when water is used as the extraction agent. Another advantage of the extraction by employing a zinc chloride solution as an extraction agent which can be mentioned is that the chloroprene monomer is virtually insoluble in the concentrated zinc chloride solution and, since the freezing point of the solution itself is lower due to the presence of zinc chloride, this solution can be used at a lower temperature than water, thus inhibiting polymerization of chloroprene during the extraction process.

The temperature range applicable to the present invention is up to about 30° C. above the freezing point of the zinc chloride solution. A temperature exceeding this level is undesirable, since such a temperature causes thermal polymerization of the chloroprene. The temperature range which is the most preferred is from −10° C. to 10° C.

For the concentration of zinc chloride solution, a saturated solution at the extraction temperature is most suitable, but a concentration of a saturated solution down to a 50% solution can also be used.

Acrylonitrile extracted in this way can be recovered by conventional processes. The following examples serve to explain further the objects and the practical applications of the present invention. Percentages used herein are weight percentages while the "parts" are parts by volume.

COMPARISON EXAMPLE 1

The extraction of acrylonitrile from chloroprene monomer was carried out at 0° C. using a counter-current multistage extraction method employing 100 parts of chloroprene monomer containing about 3% acrylonitrile with 100 parts of water as the extraction agent.

Table I shows the relationship between the extraction stages and the concentration of the acrylonitrile for each series.

TABLE I

| Series | Extraction stages (percent) | | | | | |
|---|---|---|---|---|---|---|
| | 0 | 1 | 2 | 3 | 4 | 5 |
| 1 | 2.31 | 2.02 | 1.39 | 1.08 | 0.61 | 0.37 |
| 2 | 2.31 | 2.22 | 1.58 | 1.32 | 0.91 | 0.53 |
| 3 | 2.31 | 2.26 | 1.81 | 1.70 | 1.17 | 0.84 |

The data in the table show that when an equivalent volume of water to monomer is used as the extraction agent the extraction yield is very poor.

EXAMPLE 1

For 100 parts of chloroprene monomer as used in Comparison Example 1, 100 parts of a saturated solution of zinc chloride was used as the extraction agent. Extraction was carried out at −10° C. using a counter-current multistage extraction method. The results are shown in Table II.

TABLE II

| | Extraction stages | | | |
|---|---|---|---|---|
| | 0 (percent) | 1 (percent) | 2 (percent) | 3 (percent) |
| Series: | | | | |
| 1 | 2.31 | 0.41 | 0.12 | 0.03 |
| 2 | 2.31 | 0.54 | 0.16 | 0.04 |
| 3 | 2.31 | 0.88 | 0.20 | 0.04 |

As is apparent from the data contained in Table II, the concentration of acrylonitrile at the 3rd extraction stage is below 0.1%, showing that acrylonitrile is extracted at much faster rate than results in Comparison Example 1 in which water was used as extraction agent.

EXAMPLE 2

An experiment was conducted in a similar manner as in Example 1 except that the extraction temperature was changed to 10° C. instead. The results obtained are shown in Table III:

TABLE III

| Series: | Extraction stages | | | |
|---|---|---|---|---|
| | 0 (percent) | 1 (percent) | 2 (percent) | 3 (percent) |
| 1 | 2.31 | 0.52 | 0.22 | 0.07 |
| 2 | 2.31 | 0.65 | 0.25 | 0.08 |
| 3 | 2.31 | 0.99 | 0.31 | 0.09 |

The results in this table show that although the extraction yield is somewhat lower than that obtained in Comparison Example 1, the extraction of acrylonitrile is made at a faster rate than that in Comparison Example 1.

EXAMPLE 3

An experiment was conducted employing a 50% zinc chloride solution at an extraction temperature of 25° C. in the same manner as in Example 1. The results obtained are shown in Table IV:

TABLE IV

| Series: | Extraction stages | | | | | |
|---|---|---|---|---|---|---|
| | 0 (percent) | 1 (percent) | 2 (percent) | 3 (percent) | 4 (percent) | 5 (percent) |
| 1 | 2.31 | 1.68 | 0.53 | 0.36 | 0.15 | 0.06 |
| 2 | 2.31 | 1.82 | 0.82 | 0.69 | 0.32 | 0.10 |
| 3 | 2.31 | 2.03 | 1.27 | 0.94 | 0.58 | 0.17 |

The results in this table show that the extraction yield is lower than in Examples 1 and 2 in which a saturated solution of zinc chloride was employed, but it can be seen that the method is of practical value.

TEST EXAMPLE 1

An equivalent amount of chloroprene monomer and a zinc chloride solution were emulsified by shaking at 0° C. for 5 minutes. The emulsified mixture was then placed in a graduated cylinder of a 3 cm. diameter and a 300 ml. capacity to measure the separation rate of the interface of zinc chloride solution and chloroprene monomer and also the dissolution percentage of the chloroprene monomer in the aqueous zinc chloride solution phase. A similar experiment was also conducted for comparison employing water as the extraction agent. The results obtained are shown in Table V:

TABLE V

| Extraction agent | Monomer extraction agent, volume ratio | Initial seporation rate (cm./min.) | Dissolution volume of chloroprene in zinc chloride or water phase (percent) |
|---|---|---|---|
| Water | 1/1 | 3 | 0.01 |
| Do | 1/10 | 2 | 0.06 |
| Zinc chloride (saturated solution) | 1/1 | 42 | 0 |
| Zinc chloride (50% solution) | 1/1 | 36 | 0 |

The results in the table show that when a saturated aqueous solution of zinc chloride is employed as an extraction agent, the separation rate of the interface is faster by as much as 20 times that of water used in a similar manner. Other advantages of using a zinc chloride aqueous solution as an extraction agent which were found include that, whereas chloroprene monomer dissolves in the water phase, it scarcely does so in the zinc chloride phase.

EXAMPLE 4

The extraction of acrylonitrile from chloroprene monomer was carried out at 0° C. using a single stage extraction method employing 100 parts of chloroprene monomer containing about 2% acrylonitrile with 100 parts of an extraction agent.

Table VI shows the results obtained for the extraction agent, time and the concentration of residual acylonitrile in monomer.

TABLE VI

| Extraction agents | Time (min.) | | | | |
|---|---|---|---|---|---|
| | 0 (percent) | 15 (percent) | 30 (percent) | 60 (percent) | 180 (percent) |
| Water | 1.96 | 1.49 | 1.37 | | |
| 2% NaOH aqueous solution | 1.96 | 1.86 | 1.57 | 1.49 | 1.49 |
| 20% NaOH aqueous solution | 1.96 | 1.94 | 1.94 | 1.86 | |
| Saturated ZnCl₂ aqueous solution | 1.96 | 1.12 | 0.98 | 0.94 | 0.89 |

As is apparent from the results shown in Table VI, the extraction yield is increased more by employing a saturated zinc chloride aqueous solution than with the other agents.

EXAMPLE 5

An experiment was conducted in a similar manner as in Example 4 except that the extraction method was charged to a multistage extraction.

Table VII shows the results obtained.

TABLE VII

| Extraction agent | Extraction stages | | | | | |
|---|---|---|---|---|---|---|
| | 0 (percent) | 1 (percent) | 2 (percent) | 3 (percent) | 4 (percent) | 5 (percent) |
| Water | 2 | 1.4 | 0.9 | 0.7 | 0.5 | 0.3 |
| Saturated ZnCl₂ aqueous solution | 2 | 0.8 | 0.3 | 0.1 | 0.04 | 0.002 |

As can be seen from the results shown in Table VII the extraction yield is better employing a saturated zinc chloride aqueous solution.

What is claimed is:

1. In a process for the recovery of acrylonitrile in chloroprene monomer comprising extracting the acrylonitrile from the chloroprene monomer using an extracting agent, the improvement which comprises said extracting agent being a concentrated aqueous solution of zinc chloride ranging from 50% by weight to a saturated solution and said extracting being conducted at a temperature ranging from the freezing point of said zinc chloride solution to 30° C. above the freezing point of said zinc chloride solution.

2. The process according to claim 1 wherein said concentrated aqueous solution of zinc chloride is a saturated solution.

3. The process according to claim 1 wherein said aqueous solution of zinc chloride is a 50% by weight solution.

4. The process according to claim 1 wherein said extracting is conducted at a temperature ranging from −10 to 10° C.

References Cited
UNITED STATES PATENTS

| | | | |
|---|---|---|---|
| 2,656,376 | 10/1953 | Martino | 260—465.9 |
| 2,820,812 | 1/1958 | Lichtenberger et al. | 260—465.9 X |

OTHER REFERENCES

Hata, C. A., vol. 58, 1963, p. 2335a-b.

JOSEPH P. BRUST, Primary Examiner